H. T. HAZARD.

MECHANISM FOR STEERING AUTOMOBILES.

APPLICATION FILED AUG. 3, 1916.

Reissued Oct. 30, 1917.

14,385.

2 SHEETS—SHEET 1.

INVENTOR:
HENRY T. HAZARD

BY Hazard Berry & Miller

ATTORNEYS:

H. T. HAZARD.

MECHANISM FOR STEERING AUTOMOBILES.

APPLICATION FILED AUG. 3, 1916.

Reissued Oct. 30, 1917.

14,385.

2 SHEETS—SHEET 2.

INVENTOR:
HENRY T. HAZARD

BY Hazard Berry & Miller

ATTORNEYS:

UNITED STATES PATENT OFFICE.

HENRY T. HAZARD, OF LOS ANGELES, CALIFORNIA, ASSIGNOR OF ONE-HALF TO PETER JAUSS, OF LOS ANGELES, CALIFORNIA.

MECHANISM FOR STEERING AUTOMOBILES.

14,385. Specification of Reissued Letters Patent. Reissued Oct. 30, 1917.

Original No. 1,111,693, dated September 22, 1914, Serial No. 812,005, filed January 14, 1914. Application for reissue filed August 3, 1916. Serial No. 113,029.

*To all whom it may concern:*

Be it known that I, HENRY T. HAZARD, a citizen of the United States, residing at Los Angeles, in the county of Los Angeles, State of California, have invented new and useful Improvements in Mechanism for Steering Automobiles, of which the following is a specification.

The object of my invention is to provide a steering mechanism to give additional safety to the operation of motor cars, and to that end I provide two separate steering devices so that in case of breakage of any part of either of the steering mechanisms the other will perform the services necessary to prevent the driver of the car from losing control thereof. I accomplish this object by means of the device described herein, and shown in the accompanying drawings, in which.

Figure 1:
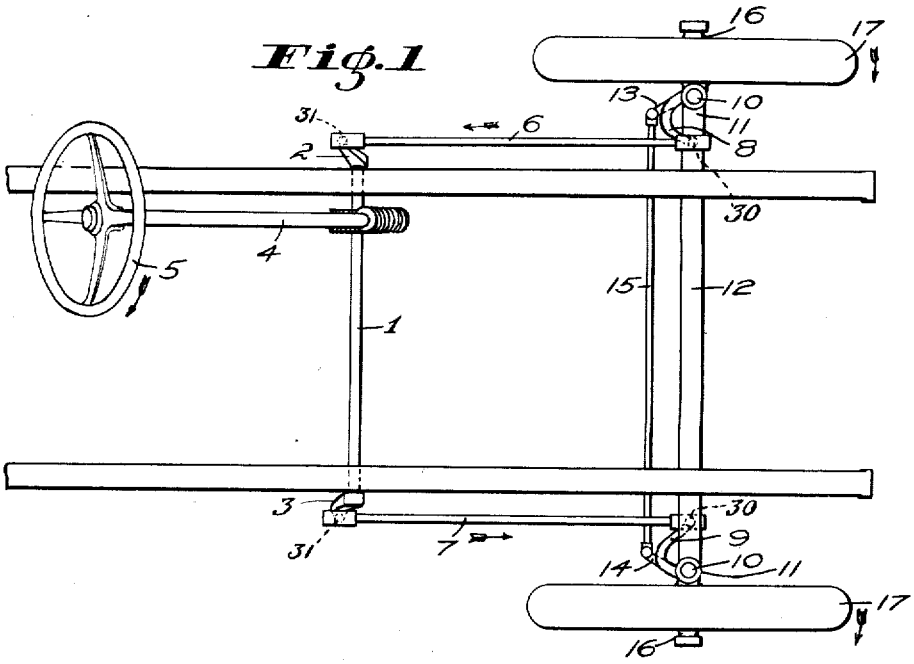
Figure 1 is a plan view of my steering device, together with so much of the frame and running gear as will illustrate the invention with other parts of the mechanism.

In the operation of a motor car excessive strain is thrown upon the steering mechanism, especially when the automobile is moving at a rapid rate over a rough road, and this continued and oft repeated strain thrown on the steering parts often causes them to break. This may cause the operator to lose control of the car, either capsizing the car or running it off the road into gulches or against posts, or other obstructions. To lessen the liability of these accidents and to render the use of automobiles less dangerous, I have provided duplicate steering mechanism, as hereinafter described.

In the various drawings, 1 represents a rock shaft upon which are mounted steering cranks 2 and 3, the crank 2 being keyed on one end of the rock shaft and extending upwardly while the crank 3 is keyed on the other end thereof and extends downwardly. The rock shaft is operatively connected in the usual manner, by means of worm and worm gear, to the steering column 4 carrying a steering wheel 5, so that turning of the steering wheel and column will produce a turning movement of the rock shaft. Extending forwardly from the steering cranks 2 and 3 are drag links 6 and 7 pivotally connected to the outer ends of steering arms 8 and 9 rigidly connected to vertical knuckles 10 pivoted within the forked ends 11 of the front axle 12. The drag links are preferably arranged to extend substantially parallel with each other on different horizontal planes and are designed to move in opposite directions in relation to each other on turning of the steering wheel. The steering arms 8 and 9 are here shown as extending inwardly toward each other, with the terminal of the arm 8 disposed on a plane above the rock shaft, and the terminal of the steering arm 9 disposed on a plane below the rock shaft. They are arranged thus on different planes so that the drag links may be disposed on a horizontal plane to neutralize, as far as possible, the forward and backward stroke of the outer ends of the steering arms, as will hereinafter be more fully explained. Mounted on the knuckles 10 are tie rod supporting arms 13 and 14 which extend rearwardly and converge toward each other and which are connected at their outer ends by means of a tie rod 15 which is pivoted to the tie rod supporting arms 13 and 14 as in the manner common in steering gear construction. The tie rod may be disposed in front instead of in the rear of the fore axle, where it will perform the same function, in which case, however, the same inclination of the tie rod supporting arms will be away from instead of toward each other. The knuckles 10 carry spindles 16 upon which the front wheels 17 of the vehicle are mounted in the usual manner.

Figure 4:
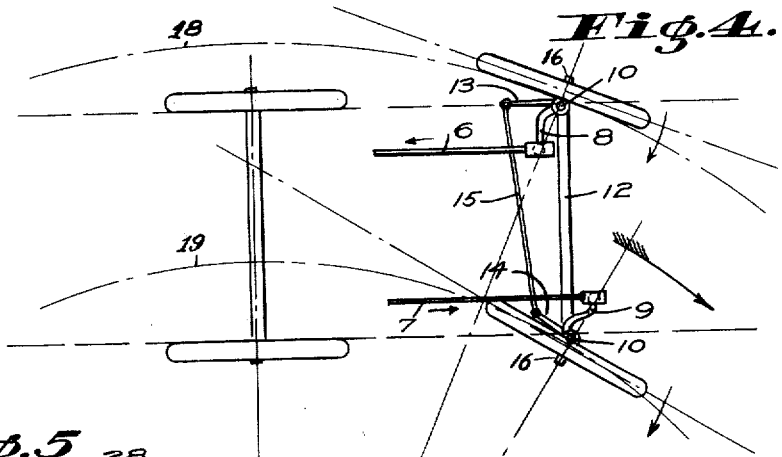
Fig. 4 is a diagram showing the position of the front and rear wheels, tie rod, and drag links when making a turn to the right.
Figure 5:
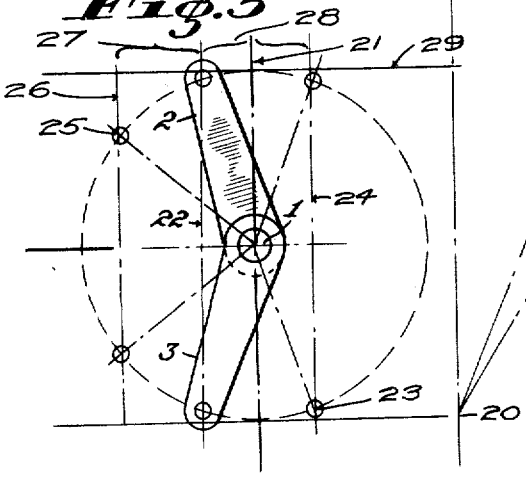
Fig. 5 is a diagrammatic view showing the position of the steering cranks mounted on the rock shaft.

The cranks 2 and 3 are arranged, in the construction shown in the drawings, particularly in Fig. 5, with the crank 3 inclined downwardly and rearwardly from the vertical center of the rock shaft, and the crank 2 inclined rearwardly and upwardly. By this arrangement each crank 2 and 3, when swinging from its normal position forwardly, passes from a point upon one side of its pivot to a point upon the opposite side thereof, but when swinging rearwardly from the normal starting position, moves wholly upon the same side of the pivot. Upon rotation to the right of the steering wheel 5 and column 4, the drag link 6 will move rearwardly and the link 7 will move forwardly and operate through the steering knuckles to turn the forward wheels to the right as indicated by the arrows in Figs. 1 and 4. The position of the drag links 6 and 7, when at their extreme stroke in turning to the right, is shown in Fig. 4, which also shows the position assumed by the tie rod in performing its function through the convergent tie rod supporting arms to effect turning of the outside wheel at a less angle than the turning of the inner wheel so that the two front wheels will travel in two concentric circles, as indicated by the arcuate dotted lines 18 and 19 in Fig. 4, this being the necessary position of the front wheels in making a turn to the right. When the wheels are thus turned, the spindles will extend in the direction of the center 20 of the arcuate lines 18 and 19; the spindles being moved through unequal angles on given movement of the steering wheel 5 caused by the convergent relation of the tie rod supporting arms 13 and 14 and the tie rod 15 connecting same. In this unequal movement the drag link 6 will move rearwardly over a shorter stroke than that of the drag link 7 on its forward stroke by reason of the arrangement of the cranks 2 and 3 and their movement in relation to a vertical plane through the center of their pivot as before described, which movement of the cranks is complementary to that of the tie rod supporting arms.

Upon the movement to the left of the steering wheel 5, the reverse operation will take place and the stroke of the drag links will be in a direction reverse to that shown in Fig. 4. The difference in the strokes of these two drag links is more particularly illustrated in Fig. 5, which shows the relative positions of the cranks 2 and 3 as secured to the opposite ends of the rock shaft and viewed from the right-hand end of the latter and showing the cranks as disposed when the car is in the straight-ahead or normal position shown in Fig. 1. These cranks point rearwardly from the central vertical line 21 and the swinging ends thereof will be disposed on the vertical line 22. Upon turning the steering wheel 5 to the right, the swinging end of the crank 3 will move forwardly to the point marked 23 on the vertical dotted line 24, and the crank 2 will move rearwardly to the point marked 25 on the vertical dotted line 26, and the distance between the lines 26 and 22 represents the rearward stroke of the crank 2. This distance is indicated by the bracket 27. The distance from the line 22 to line 24 represents the forward movement of the crank 3 and is indicated by the bracket 28. The difference between these points, as shown on the horizontal line 29, will give a difference between the forward stroke and the rearward stroke of the cranks producing the difference in the angle of direction of the two front wheels complementary with the action of the drag links. In order to effect these complementary movements of the drag links and tie rod, the steering cranks 2 and 3 are set at an angle to the perpendicular corresponding to the inclination toward each other of the tie rod supporting arms 13 and 14.

The elements or parts in the usual single steering device are subjected to continuous strains, especially in rapidly passing over rough roads, and after a time one or the other thereof may become crystallized and break, often with serious results. These parts, however, are usually of sufficient strength to resist these strains under ordinary conditions but it has been found by experience that in localizing the strains on these various parts they often crystallize and give way, different parts at different times. By duplicating the parts, as here shown, it is very unlikely that any two of corresponding parts will break or give way at the same time, thus practically eliminating any danger thereof. By the present arrangement the tie rod 15 can be broken or dispensed with and the steering mechanism remain operative; also either of the drag links 6 or 7 can be broken or dispensed with without destroying the steering function of the remaining parts. Likewise, either of the steering arms 8 or 9 may be broken or dispensed with or the rock shaft may be broken on either side of the worm gear, and the steering mechanism remain operative.

In this mechanism the relation of the parts is such that if any link connecting two moving arms were removed, the arms would still move just as though the link had not been removed. In other words the distance between the swinging ends of two such arms remains constant for all the different positions the steering mechanism may assume. It will thus be seen that in an automobile equipped with my duplex steering device the steering mechanism will be rendered very unlikely to become inoperative, whereas in motor cars having the usual steering mechanism the breakage of any one of these parts may cause the driver to lose control of the car.

Figure 6:
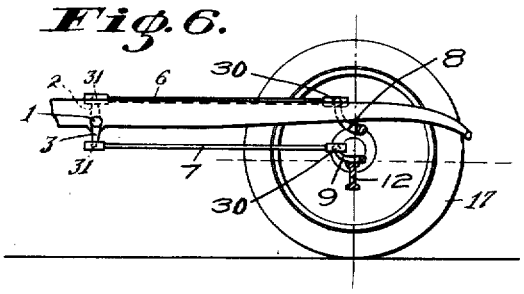
Fig. 6 is a fragmentary view showing a modification.
Figure 2:
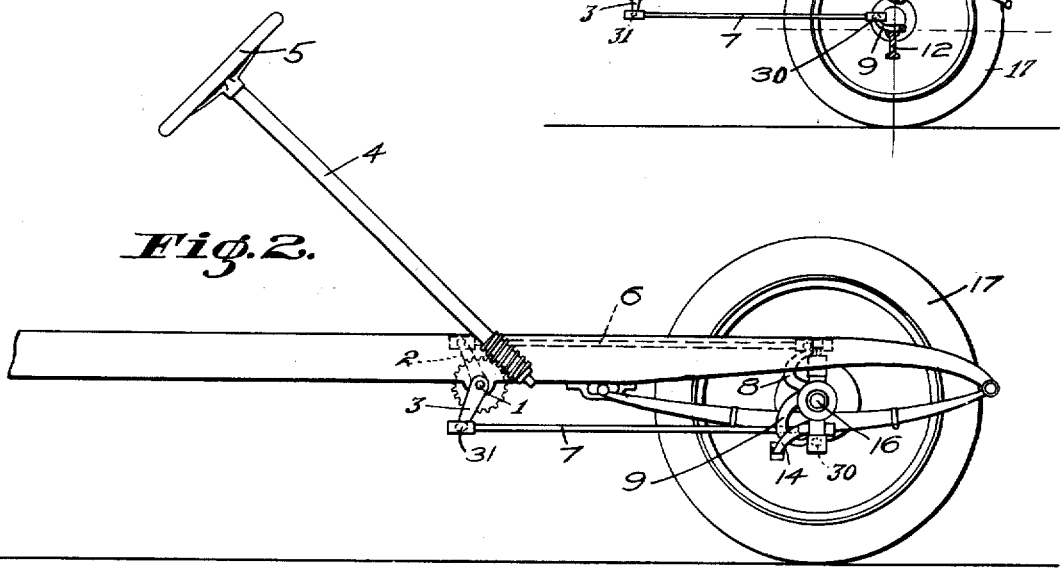
Fig. 2 is a view in side elevation of the parts shown in Fig. 1.
Figure 3:
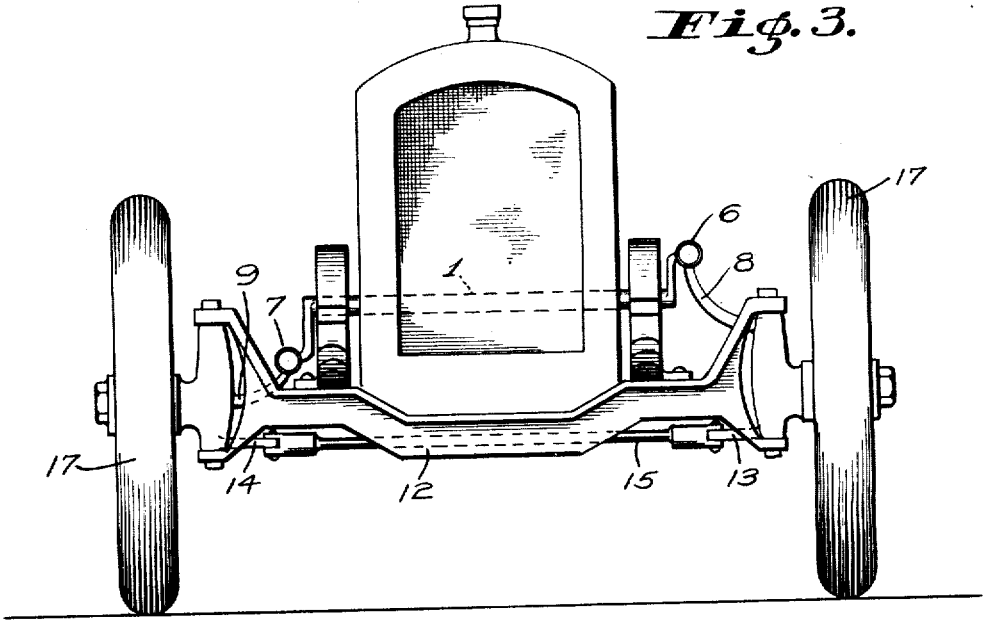
Fig. 3 is a view in front elevation with the radiator in place.

In Fig. 6 I have shown a modification whereby the pivot balls 30 on the steering arms 8 and 9 may be disposed in a position in the rear of a vertical line which bisects the front axle and the pivot ball 31 on the steering crank 3 in a vertical line below the center of the rock shaft 1 with the pivot ball 31 on the swinging end of the crank 2 in a position directly above the center of the rock shaft 1. When the steering mechanism is mounted in this manner it will produce a like result as if the swinging ends of the steering cranks were disposed rearwardly from the center line drawn through the rock shaft and the steering knuckles disposed immediately above the center of the axle as shown in Figs. 1, 2 and 4.

The various parts are shown in the position occupied while the car to which they are applied is in its normal position, (except on Fig. 4) that is, when the car is moving in a straight line forwardly, or at rest with the forward wheels in the position which they assume in moving in a direct line forwardly. In Fig. 4 it is shown turning to the right, and it will be understood that the various descriptions and claims herein contained refer to the car in its normal position, that is, the parts are shown and described in the position they assume when the car is moving directly forward, unless otherwise stated.

The position of the swinging ends of the steering arms with regard to the vertical plane extending from the center of one spindle to the center of the other will indicate the angle rearwardly to give the steering cranks to meet the varying stroke of the steering arms, the movement of which is controlled by the action of the tie rod, that is to say if these swinging ends are disposed in the vertical plane above mentioned then the steering cranks must be inclined rearwardly to meet this varying stroke, if the swinging ends are disposed rearwardly of this plane to such an extent as to make up the difference in the stroke, then the cranks must be placed vertically. This difference can be obtained by the placement of the swinging ends of the steering arms in the rear of the vertical plane of the spindles, or this difference of stroke can be obtained partly in the placement of the steering arm and partly in the placement of the steering cranks. Always that difference must be made up either in one or both,—to illustrate, if the swinging ends of the steering arms are placed to the rear one-fourth of the amount required then the steering cranks must be placed to the rear, so as to make up the other three-fourths.

The incessant wabbling of the front wheels in passing over uneven surfaces in the road—in cars equipped with the single type of steering gear—is caused not by the uneven surfaces, but by reason of the fact that the body to which the rear end of the steering link is secured moves rapidly up and down, while the front axle to which the front end of the steering link is secured follows practically the contour of the road, causing the body and the axle to move rapidly toward and away from each other, and the front end of the steering link to move forward and back, relative to the body, moving the wheels to the right or the left, with dangerous effect if the car is moving rapidly. This may be illustrated by jacking up the front wheels to clear the floor and moving the front end of the body up and down when the car is at rest—the hand steering wheel being prevented from turning, the wheels will wabble in the same manner which they do while the car is passing over uneven surfaces in the road. This incessant turning of the front wheels from one side to the other begets a swaying motion of the car, rendering it often difficult for the driver to keep the car in the road. At such times it becomes necessary to slow down to avoid accident. This incessant wabbling of the front wheels begets an undue wear on all parts of the steering gear, often with dangerous results. A like wabbling effect of the front wheels is caused by the compression and consequent lengthening of the front springs, the front end of the spring being secured to the front end of the frame and rigidly secured to the front axle. The axle to which the steering arms are securely affixed will move back and forward relative to the body which will cause a forward and backward movement of the drag links and cause a swaying motion of the front wheels. This wabbling is prevented in a car equipped with my improvement as follows:—Having two steering or drag links, each one reaching from the front wheel to the steering crank, when the body of the car is caused to approach the front axle, the forward ends of the two drag links will move forward or backward together. This simultaneous movement of both drag links in the same direction will have the effect to neutralize any action caused thereby, and to hold both wheels in proper forward alinement, because the tie rod 15 will not permit one wheel to turn in one direction and the other in another direction. Now a forward stroke of both the drag links would, in the absence of the tie rod, cause the right wheel to turn to the right and the left wheel to the left, which the tie rod will prevent, the result being that the direction of neither wheel is affected. The usual coiled or helical spring in the ends of the drag links will compensate for the difference in length required to adapt the drag links to the different positions they assume when the car is being operated. Another advantage consists in the fact that the hand-steering wheel is prevented from the incessant jerky, oscillating motion which occurs with the ordinary single steering device, and the liability of the wheel being jerked out of the hands of the driver thereby is also prevented. These advantages are secured by the duplex steering device, in addition to the safety afforded in the case of the breakage of any of the parts of the steering mechanism.

What I claim is:

1. In a steering mechanism of the character herein described, a pair of spindles, wheels on said spindles, a steering arm and a tie rod supporting arm on each spindle, a tie rod carried by said tie rod supporting arms, steering cranks, rigid unbendable drag links operatively connecting the swinging ends of the steering arms with the swinging ends of the steering cranks, said steering cranks arranged to maintain a constant distance between the swinging ends of the steering arms and the swinging ends of the steering cranks.

2. In a steering mechanism of the character herein described, a pair of spindles, a steering arm on each spindle, a tie rod supporting arm on each spindle, a tie rod connecting said last mentioned arms adapted to give the spindles the proper position in turning, a steering column, a hand steering wheel thereon, steering cranks connected with the steering column adapted to swing back and forth on the rotation of the hand steering wheel, and rigid unbendable drag links extending from the swinging ends of the steering arms to the swinging ends of the steering cranks, the cranks and arms arranged to give a free movement to the drag links while turning in either direction.

3. A duplex steering device, comprising a steering column carrying on its lower end a worm, a rock shaft transversely mounted and carrying a gear meshing with the worm, said rock shaft carrying a pair of steering cranks, one crank extending upwardly and one downwardly, both of said cranks being inclined rearwardly from a vertical plane through the axis of the rock shaft, and a drag link connecting the steering arm on each side with the corresponding crank.

4. In an auto car provided with the usual steering device, comprising a steering arm mounted on the knuckle of one of the fore-wheels, the usual tie rod supporting arms inclined toward or away from each other, usual tie rod supported thereby, the usual drag link extending from said steering arm to the usual steering crank keyed on the rock shaft, the herein described supplementary steering mechanism adapted to act in concert with the hereinbefore mentioned device or independently thereof comprising an extension on the rock shaft, a supplemental steering crank on the extension, both steering cranks having an inclination rearwardly equal to the inclination toward or away from each other of the tie rod supporting arms, a supplementary steering arm on the knuckle of the other fore-wheel and a supplementary drag link operatively connecting the swinging end of the supplementary steering crank with the supplemental steering arm.

5. A duplex steering device comprising a pair of steering arms one on the spindle of each front wheel, a rock shaft, steering cranks keyed thereon, drag links operatively connected at their forward ends to the steering arms, and at their rear ends to the swinging ends of said steering cranks, one of said steering cranks extending upwardly and one downwardly, operatively connected with the steering column, and placed at an angle to the rear of a vertical line through the axis of the rock shaft, whereby on the rotation of the steering column one drag link will move forwardly over a longer stroke causing the fore wheels to describe different concentric circles in steering, the outer wheel the larger and the inner wheel the smaller circle.

6. A duplex steering mechanism for auto cars comprising a pair of steering knuckles, each one carrying a spindle, a steering arm and a tie rod supporting arm, the last-mentioned arms inclined to give the front wheels the proper direction in steering and in turning, a tie rod connecting these tie rod supporting arms, a rock shaft operatively connected with the steering column and the steering knuckles, steering cranks on the rock shaft, drag links extending from the steering cranks to the steering arms, the steering cranks mounted on the rock shaft to meet the varying strokes of the steering arms.

7. A duplex steering-device comprising a pair of steering arms, one on the spindle of each front wheel, a rock-shaft, steering-cranks secured thereon, drag-links operatively connected at their forward ends to the steering arms, and at their rear ends to the swinging ends of the steering cranks, the steering-arms and the steering cranks one or both being inclined rearwardly, this inclination may be in one, it may be in both, the sum total of such inclination rearwardly being equal to the angle of the tie-rod supporting arms to the spindle.

8. In a steering-device, a steering-column, steering cranks actuated thereby, spindles carrying steering-arms and tie-rod supporting arms, the arms arranged at an angle to the spindles to give the front wheels the proper angle in turning, a tie-rod carried by the tie-rod supporting arms, the steering-arms or the steering-cranks or both arranged on their respective supports to meet the varying stroke of the tie-rod supporting-arms.

9. In a steering-mechanism of the character herein described, a pair of spindles, wheels thereon, each spindle having a tie-rod-supporting arm and a steering arm, the tie-rod-supporting arms arranged at an angle to the spindles to give the wheels the proper angle in turning, and the latter arranged with the steering-cranks to meet said angle and coöperate therewith, a tie-rod connecting the tie-rod-supporting arms to keep the spindles in proper position while steering, means for carrying a pair of swinging steering cranks, including a transverse rock shaft, a pair of cranks on said means, rigid, unbendable drag links connecting the swinging ends of the steering cranks with the swinging ends of the steering arms, means to operate the steering cranks, the steering cranks and the steering arms positioned on their respective supports to maintain a constant distance between the swinging ends of the cranks and the swinging ends of the steering arms while being operated.

10. A steering column carrying a worm, a rock shaft carrying a worm gear and a pair of steering cranks, steering knuckles each carrying a spindle, a steering arm and a tie-rod supporting arm, tie-rod operatively connecting the tie-rod supporting arms, a pair of rigid, unbendable drag links operatively connecting the steering cranks and the steering arms, the steering arms and the steering cranks arranged on their respective supports to meet the varying stroke of the tie-rod to give the spindles the proper position in steering.

Los Angeles, California, July 27, 1916.

HENRY T. HAZARD.

Correction in Reissue Letters Patent No. 14,385.

It is hereby certified that Reissue Letters Patent No. 14,385, granted October 30, 1917, upon the application of Henry T. Hazard, of Los Angeles, California, for an improvement in "Mechanism for Steering Automobiles," were erroneously issued to the inventor, Henry T. Hazard, and Peter Jauss as assignee of one-half interest, whereas said Letters Patent should have been issued *to the inventor said Hazard*, he being owner of the entire interest in said invention, as shown by the records of assignments in this office; and that the said Letters Patent should be read with this correction therein that the same may conform to the record of the case in the Patent Office.

Signed and sealed this 5th day of March, A. D., 1918.

[SEAL.] R. F. WHITEHEAD,

*Acting Commissioner of Patents.*

Cl. 21—199.